(12) United States Patent
Harris

(10) Patent No.: US 7,403,974 B1
(45) Date of Patent: Jul. 22, 2008

(54) TRUE ZERO-COPY SYSTEM AND METHOD

(75) Inventor: Gordon J. Harris, Somerset, NJ (US)

(73) Assignee: EMC Corporation, Hopkinton, MA (US)

( * ) Notice: Subject to any disclaimer, the term of this patent is extended or adjusted under 35 U.S.C. 154(b) by 1298 days.

(21) Appl. No.: 09/891,020

(22) Filed: Jun. 25, 2001

(51) Int. Cl.
*G06F 15/16* (2006.01)
*G06F 15/167* (2006.01)
*G06F 12/10* (2006.01)

(52) U.S. Cl. .................. 709/213; 709/214; 709/216; 709/218; 709/231; 711/202; 711/203; 711/206; 711/207

(58) Field of Classification Search .............. 709/103, 709/216, 230, 328, 213, 214, 218, 231, 238; 703/26; 711/207, 202, 203, 206
See application file for complete search history.

(56) References Cited

U.S. PATENT DOCUMENTS

| | | | | |
|---|---|---|---|---|
| 5,815,686 A | * | 9/1998 | Earl et al. ............. | 703/26 |
| 5,852,719 A | * | 12/1998 | Fishler et al. .......... | 709/216 |
| 5,860,146 A | * | 1/1999 | Vishin et al. ........... | 711/207 |
| 6,145,064 A | * | 11/2000 | Long et al. ............ | 709/103 |
| 6,374,341 B1 | * | 4/2002 | Nijhawan et al. ....... | 711/207 |
| 6,738,821 B1 | * | 5/2004 | Wilson et al. ......... | 709/230 |
| 6,934,760 B1 | * | 8/2005 | Westbrook et al. ..... | 709/231 |
| 2002/0019887 A1 | * | 2/2002 | Moore ................ | 709/328 |
| 2003/0097481 A1 | * | 5/2003 | Richter .............. | 709/230 |

OTHER PUBLICATIONS

M.N. Thadani, Y.A. Khalidi, An Efficient Zero-Copy I/O Framework for UNIX,® May 1995, Mountain View, CA.
J.C. Brustoloni, P. Steenkiste, "Effects of Buffering Semantics on I/O Performance," Oct. 1996, Seattle, WA.
C. Kurmann, M. Muller, F. Rauch, T.M. Stricker, "Speculative Defragmentation—A Technique to Improve the Communication Software Efficiency for Gigabit Ethernet," Zurich, Switzerland.
Hsiao-keng Jerry Chu, "Zero-Copy TCP in Solaria," Jan. 1996, San Diego, CA.

* cited by examiner

*Primary Examiner*—Quang N. Nguyen
(74) *Attorney, Agent, or Firm*—Fish & Richardson P.C.

(57) ABSTRACT

A method and system for moving data from a network layer into a physical memory page, wherein said physical memory page comprising a plurality of physical memory clusters, creating a logical page providing an aligned view of the data, establishing a relationship between the logical page and the physical memory page such that the logical page is associated with said plurality of physical memory clusters, and forwarding a list of the logical pages to a storage resource such that the data referenced by the logical pages are stored subsequently into a storage resource.

3 Claims, 9 Drawing Sheets

$C_1 < O_1, L_1 >$ $C_1 < O_1, L_1 >$   $C_2 < O_1, L_1, (O_1+L_2)-(O_1+L_1) >$

TRUE ZERO-COPY SYSTEM AND METHOD

BACKGROUND

This invention relates to managing data movement between computers, and more particularly to an improved method and system of moving data between a network and a storage resource using a true zero-copy system and method.

Network data differs from data stored on a storage resource such as a disk. For example, in an Ethernet network, network data can be transmitted and received as data packets that can be characterized as being odd-sized, arriving asynchronously or without warning, and having metadata such as protocol information embedded along with real data. In contrast, disk data may be characterized as being aligned, the size of the data being known, and containing only real data. As a result, disk data can be more easily managed than network data.

In order to move network data to a storage resource, a computer system may need to copy and format network data to be more compatible with disk data. Copying data from one format to another often requires the computer system to copy data from one memory area to another memory area. As a result, data throughput may be decreased due to the overhead involved in copying data.

SUMMARY

In a first aspect, the invention provides an improved method of moving network data to a storage resource. The method includes moving data from a network layer into a physical memory page, wherein said physical memory page comprising a plurality of physical memory clusters. The method also includes creating a logical page providing an aligned view of the data, establishing a relationship between the logical page and the physical memory page such that the logical page is associated with a plurality of physical memory clusters, and forwarding a list of the logical pages to a storage resource such that the data referenced by the logical pages are stored subsequently into a storage resource.

In one implementation of the first aspect, the physical memory layer can be divided into physical memory clusters such that the data received by the network layer is stored into the physical memory clusters. In another implementation, the method can comprise creating a logical page based on the offset and length of the data associated with a network write operation. In yet another implementation, the method can include creating a read only logical page of zeros.

In another implementation of the first aspect, the method can comprise merging an existing physical memory cluster with a new physical cluster based on the offset and length of the existing physical memory cluster and based on the offset and length of the new physical memory cluster.

In a second aspect, the invention provides a computer system for performing a method of moving network data to a storage resource, wherein the computer operates according to the methods described above.

In a third aspect, the invention provides an article comprising a computer-readable medium that stores computer executable instructions for controlling the operation of a computer to move network data to a storage resource, wherein the computer operates according to the methods described above.

With the methods and systems using the true zero-copy technique disclosed in the present invention, the movement of network data to a storage resource may be improved. In addition, the techniques may permit network file write operations to be processed without unnecessarily involving the CPU in copying the network data to the storage resource. As a result, the processor bottleneck associated with copying data may be avoided enabling an increase in data throughput.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION AND DESCRIPTION OF PREFERRED EMBODIMENT

Figure 1:
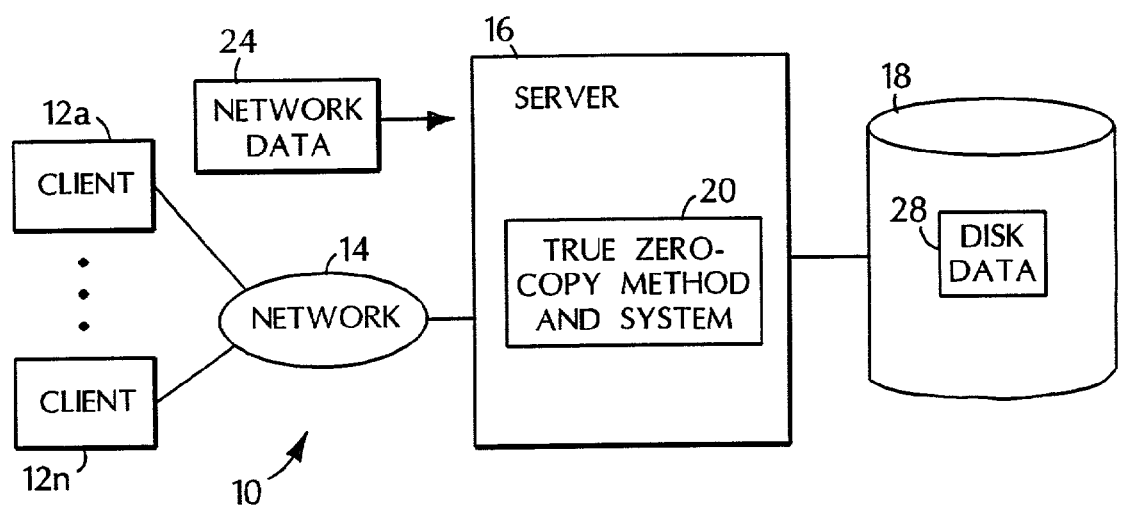
FIG. 1 is a system diagram illustrating a computer network system according to the present invention.

FIG. 1 is a system diagram illustrating a computer network system 10 according to the present invention. The system 10 can include one or more client computers 12a through 12n, capable of communicating with a server computer 16 over a computer network 14 such as Ethernet. The server 16 can include any computer capable of providing file services to the client computers 12a through 12n over the network 14 such as a network attached server (NAS). The file services provided by the computer network system 10 can be implemented using a storage resource system 18 such as any variety of data storage devices, such as a hard disk drive, rewritable optical drives, and the like.

Disk data blocks 28 stored on the data storage device may be characterized as fixed in length and aligned in the data storage device 18 allowing it to be easily managed. However, a request by the client computer 12a through 12n to read/write data to a storage resource 18 can include network data 24 which may be patterned in a manner not compatible with the characteristics of the storage resource device 18. A true zero-copy method and system 20, which will be discussed in further detail below, can facilitate a client computer's request to read and/or write data by making the network data 24 more compatible with the characteristics of the storage resource device 18.

Figure 2:
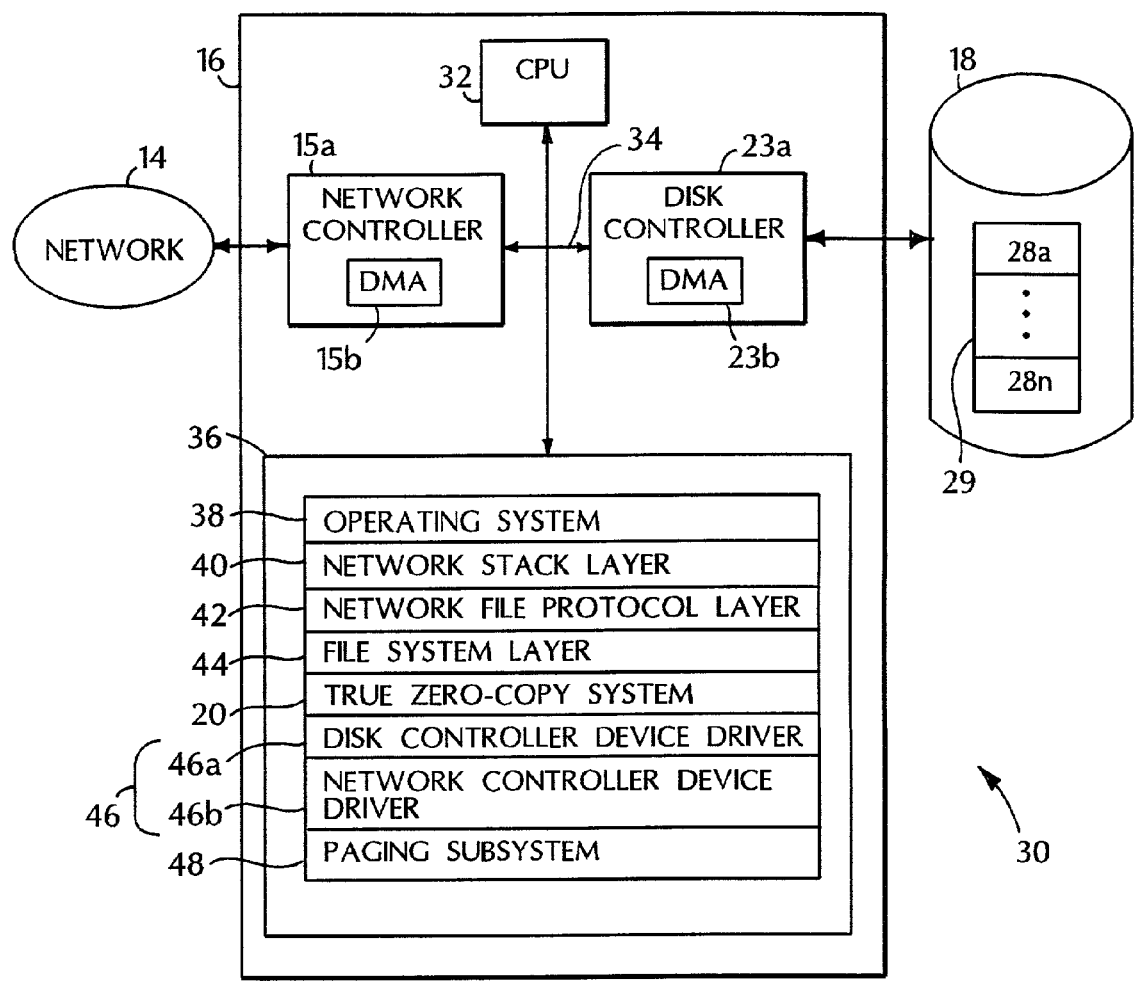
FIG. 2 is a system diagram illustrating a computer system according to the present invention.

FIG. 2 is a system diagram illustrating a computer system 30 implementing a zero-copy method and system according to the present invention. The server 16 can include a central processing unit (CPU) 32 such as an Intel Pentium connected to a memory system 36 over a computer bus 34. The memory system 36 can include main memory components such as dynamic random access memory (DRAM), rambus dynamic random access memory (RDRAM), or other memory types. The memory type or CPU type is not important to the present invention. The memory system 36 can store programs that can be executed by the CPU 32 and store data that can be processed by the CPU 32. Such a program can be, for example, an operating system (OS) 38 running on the server 16 for managing the server and its resources. An example of such an OS 38 can include CrosStor NAS OS, Unix, Windows NT, or any other OS.

The memory system 36 also can store programs for facilitating the operation of the server 16 such as a network stack layer 40 which can include a transport control protocol/internet protocol (TCP/IP) protocol stack for communicating over the network 14. By way of illustration, the computer network 14 may be an Ethernet network, although all other network systems may enjoy the benefit of the invention.

The memory system 36 also can store a network file protocol layer 42 which can interpret a read/write file request issued by a client computer 12a through 12n over the network 14. For example, the network file protocol layer 42 can include a Common Internet File System (CIFS) which can run under Windows OS, a Network File System (NFS) which can run under Unix, or other network file protocol layer. The network file protocol layer 42 also can provide an interface between the network stack layer 40 and a file system layer 44. The file system layer 44 can be a procedure that can provide a mechanism for storing and retrieving files 29 that may reside on the storage resource system 18. The files 29 can include disk data 28a through 28n representing discrete blocks of data.

A device driver 46 can include low-level procedure which may provide a software level interface between peripheral devices and the computer bus 34. For example, a disk controller device driver 46a may provide a low-level software interface between the disk controller 23a and the computer bus 34. The zero-copy technique 20, which will be discussed in detail below, can include a set of procedures and data structures, such as, logical and physical pages, residing in memory 36.

The memory system 36 may also include a paging subsystem 48 which can manage memory allocation for the computer server 16 including managing the logical and physical pages of the memory system. For example, when a server 16 is running out of memory 36, the least recently used (LRU) data pages can be flushed out to disk so that the pages in memory can be reclaimed.

The storage resource system 18 may provide long-term readable and writable storage. Such storage may be provided by a redundant array of inexpensive drives (RAID) subsystem, optical drives, or other non-volatile storage. A disk controller 23a and the disk controller device driver 46a can facilitate the exchange of disk data between the storage resource 18 and the computer bus 34. Likewise, a network interface card (NIC) 15a and a network controller device driver 46b can facilitate the exchange of network data between the network 14 and the computer bus 34. The disk controller 23a and the NIC 15a may include a scatter/gather direct memory access (DMA) engine 23b and 15b, respectively. Other memory access techniques may be used. A DMA engine can enable peripheral interface cards to send or receive data to/from multiple non-contiguous memory location or data streams and form them into a single, contiguous memory block or data stream.

Figure 3A:
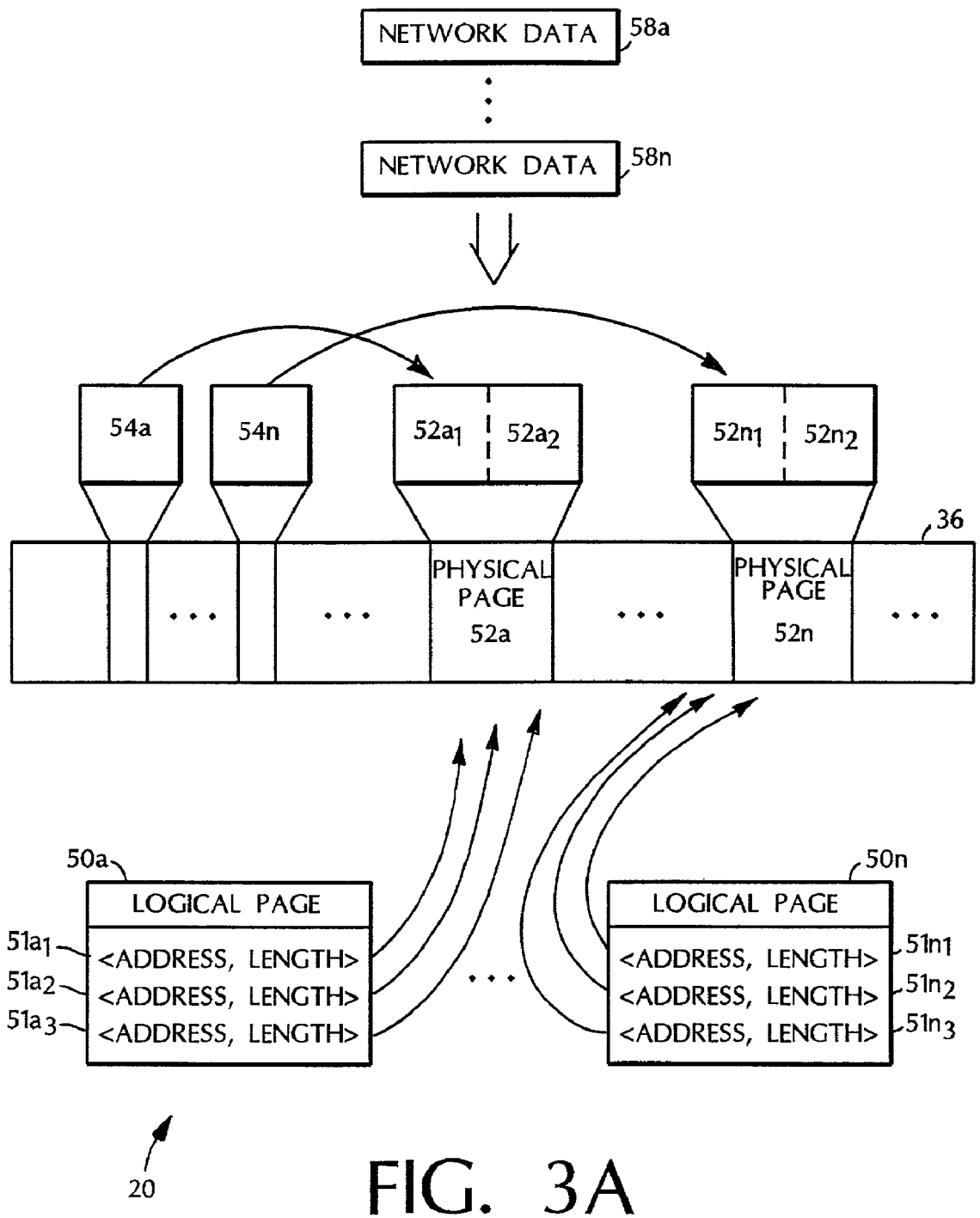
FIGS. 3A-3C are diagrams illustrating memory components comprising a true zero-copy system according to the present invention.

FIG. 3A is a diagram that provides an overview of an embodiment of the true zero-copy system 20 according to the present invention. The system 20 can include logical pages 50a-50n each which may include references 51a1-51n1 to physical pages 52a-52n. Each physical page can be further subdivided into equally sized clusters. The size of a cluster is dependent on the native packet size of the underlying network technology. Ethernet, for example, has a native packet size of 1536 bytes, which means that two clusters can fit into a single 4 KB page. Other network implementations will have different cluster sizes. Note that if the cluster size is greater than a 4 KB page, then multiple physical pages would be needed to represent a cluster. For Ethernet, each physical page 52a-52n can be subdivided into cluster pairs (52a1-52a2), (52n1-52n2) which can be used to store network data packets 58a-58n that may arrive over the network 14. The logical pages 50a-50n and the physical pages 52a-52n can reside in memory 36. The logical pages 50a-50n can represent a limited amount of data, which is referenced by the physical pages 52a-52n. Each physical page includes page structures 54a-54n that include information related to the physical pages 52a-52n, such as, the state of the data, whether the data is valid, the number of references to the data, synchronization primitives, lists that allow the page entry to be indexed, sorted, and other information.

The logical pages 50a-50n reference physical pages 52a1-52an through <address, length> tuples. The "address" represents the location in physical memory of the physical page and the "length" represents the length of the data within the particular physical page. A <address, length> tuple does not cross a 4 KB physical page boundary.

Figure 3B:
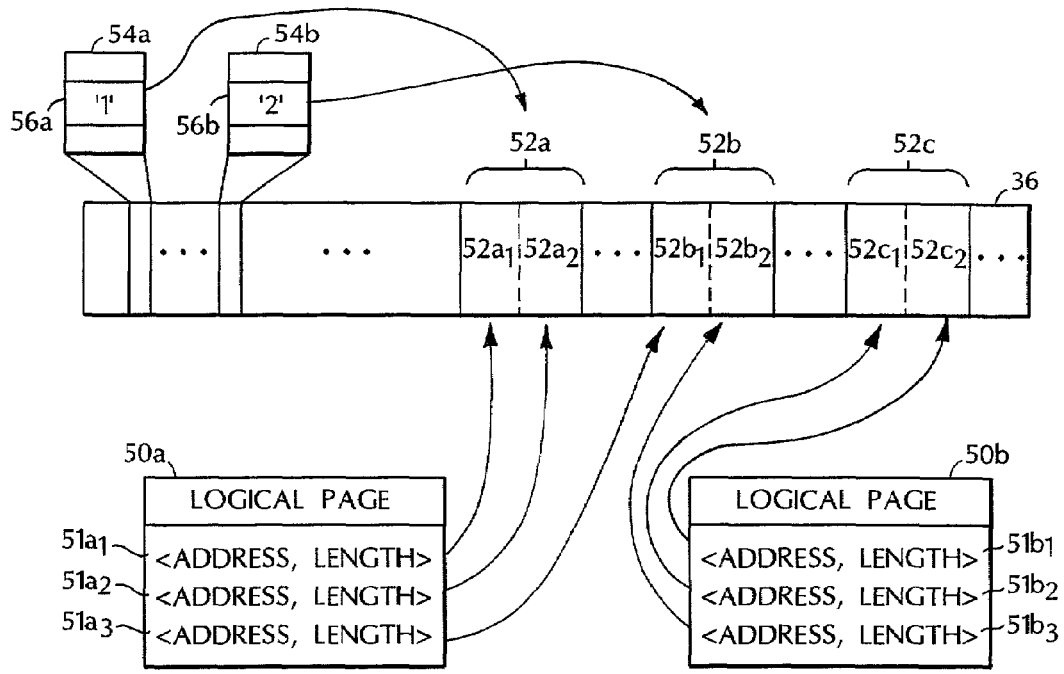

FIG. 3B is a diagram that provides an example of a true zero-copy movement system 20 according to the present invention. Once network data has been received over the network 14 and stored in the physical pages, the computer server 16 can allocate logical pages. For example, a logical page 50a can refer to cluster 52a1 using reference 51a1 and refer to cluster 52a2 using reference 51a2. Cluster 52a1 and 52a2 are included within the physical page 52a. In addition, the logical page 50a can refer to a cluster 52b1, which is in a different physical page 52b, by using reference 51a3. The physical page 52b contains cluster 52b1 and 52b2. Since the cluster 52b2 is available, it can be referenced by another logical page such as logical page 50b.

As a result, the reference count field 56a, which is in the data structure 54a associated with the physical page 52a, can be set to "1" since the physical page 52a is referenced only by one logical page 50a. In contrast, the reference count field 56b in the data structure 54b associated with the physical page 52b can be set to "2" since two logical pages are referring to the same physical page. The reference count field 56a-56n in the page data structure can be used to keep track of the number of references to the physical pages and whether one or multiple logical pages are referring to the same physical page.

In an Ethernet computer network implementation, data packets transmitted over the network may have a packet size of, typically 1536 bytes. For other networks, the size of the data packets may differ. For a file write operation requested by a client directed to the server over the network, approximately 1400 bytes of the 1536 bytes is available for data that can be stored as disk data. Therefore, at least three data packets each 1536 bytes in length may be necessary to represent 4 KB of data.

The true zero-copy technique 20 can accommodate greater or lesser amounts of data as well as data packets sizes other than 1536 bytes or irregularly sized network file write requests. As discussed above, each 4 KB physical page may be subdivided into two 2 KB portions called clusters. For example, the physical page 52a can be subdivided into a first 2 KB portion 52a1 and a second 2 KB portion 52a2.

Figure 3C:
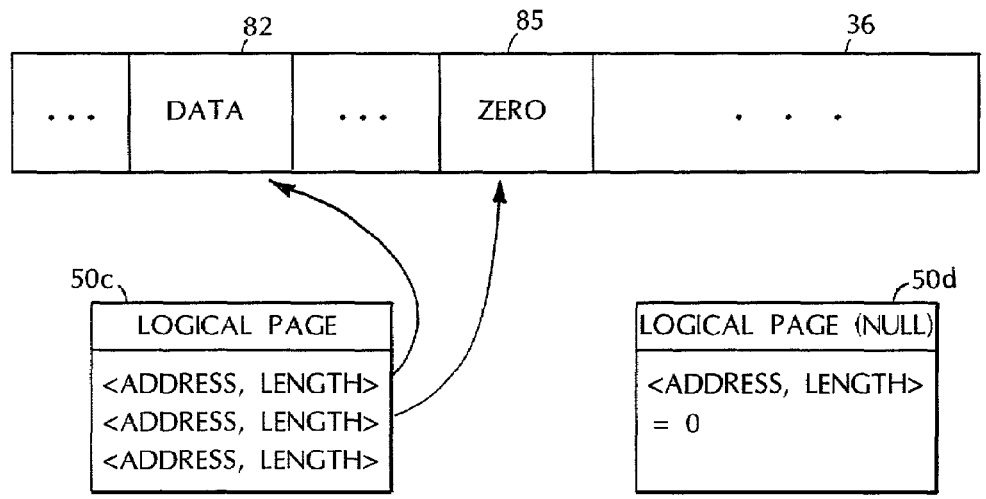

FIG. 3C shows the different types of physical page types (segments) that can be used to perform segment merge operations efficiently, which will be discussed later. For example, a logical page 50c can reference a data segment 82 which can be used to represent valid data within a physical page. In another example, the logical page 50c can reference a read-only segment 85 found within a physical page which can comprise a global page of zeroes. The global page of zeroes is a convenient technique to represent the "data hole" case with sparse files and can be represented by a single <address, length> pair. Since all logical pages representing a zero page may share the global page of zeros, the global page itself may not be modified.

In a still further example, a logical page 50d also can refer to a NULL segment which represents uninitialized data. The <address, length> pair representing a NULL segment is specially marked with an "address" value of zero. Such is typically used to represent the initial state of a newly created logical page. A read or write operation may not be performed on a NULL segment since the data contents are undefined.

Figure 4:
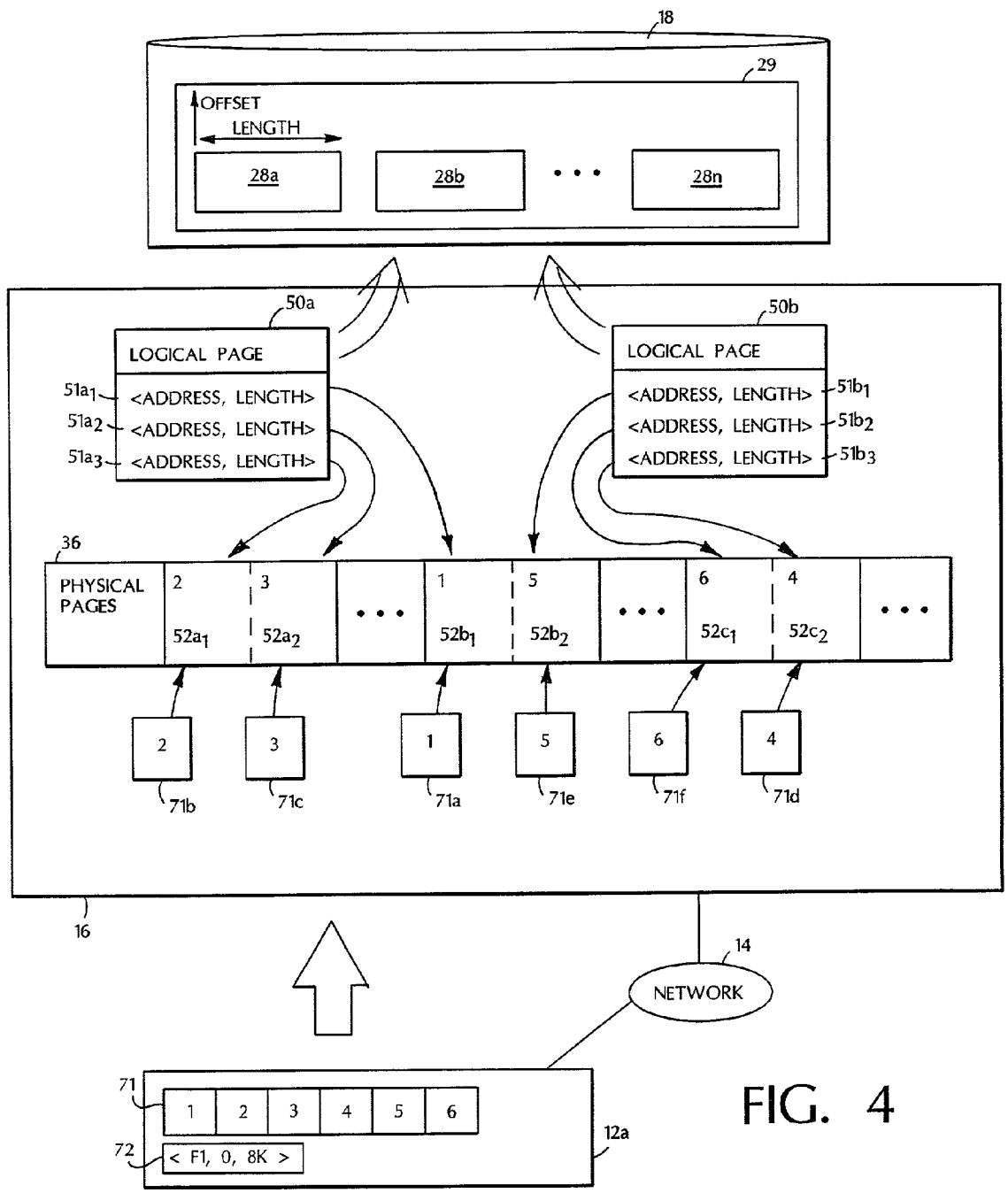
FIG. 4 is a diagram showing a file write request operation according to the present invention.

FIG. 4 shows a block diagram illustrating how file write requests from a client computer 12a are processed according to the invention. The client computer 12a can issue a file write request 72 using a network file protocol such as NFS or CIFS. The file write request 72 can be represented by <file-name, offset, length>, where "file-name" represents the name of the file requested, the "offset" represents the location of data relative to the beginning of the file requested, and the "length" represents the amount of data requested beginning from the "offset" location specified. For example, the file write request 72 is represented by <F1, 0, 8 KB> where "file-name"=F1, "offset"=0, and the "length"=8 KB.

The client computer 12a may partition the "8 KB" data 71 corresponding to the file write request 72 into separate network data packets according to the packet size requirements of a particular network. For example, in a network using Ethernet, the packet size would be 1536 bytes. For the CIFS protocol, 128 bytes of header information is used which results in approximately 1400 bytes real data. As a result, the 8 k data, in this example, can be divided into six data packets 71a through 71f each 1536 bytes in length to be transmitted over the network.

As a result, the computer system 16 receives six network data packets 71a through 71f associated with the file write request 72. Although, the data packets may be transmitted sequentially over the network, each data packet may arrive in a sequence that is different from the transmitted sequence. For example, the data packet 71a represents the first data packet in the 8 KB sequence and may be transmitted first, however, it may not be the first data packet to arrive at the system 16. The arrival rate and the arrival sequence of the data packets may vary due, in part, to the nature of packet based networks such as Ethernet. In this example, the first data packet to arrive is the data packet 71b which is subsequently stored in cluster 52a1 of the physical page 52a. In contrast, data packet 71a arrived after data packet 71c and is subsequently moved into cluster 52b1 of physical page 52b.

Upon receipt of the data packets 71a through 71f, the computer system 16 can process the file write request 72 including the <file-name, offset, length> information. For example, the system 16 determines that the file 29 corresponds to the "file-name" in the write request. File 29 is represented by disk blocks 28a through 28n. Each disk block represents a fixed amount of data, 4 KB in this example. In addition, each disk block is associated with an "offset" representing the offset from the beginning of the file and a "length" representing the length of data in each disk block. For example, the file 29 contains disk data blocks 28a, 28b, through 28n.

The system 16 needs to move the data packets that have been received and subsequently stored in the physical pages to the corresponding disk blocks 28a and 28b. As a result, the system 16 can create logical pages 50a and 50b. The logical pages 50a and 50b include references 51an and 51bn that point to the physical pages 52a, 52b, and 52c. As discussed above, the references can include an <address, length> pair where the address corresponds to the address of the cluster portion of the physical page and the "length" corresponds to the length of data in the cluster portion of the physical page.

For example, the logical page 50a can include three <address, length> pairs. Address pair 51a1 points to cluster 52b1 corresponding to data packet "1", address pair 51a2 points to cluster 52a2 corresponding to data packet "3", and address pair 51a3 points to cluster 52a1 corresponding to data packet "2". Clusters 52a1 and 52a2 are part of the physical page 52a while cluster 52b1 is part of the physical page 52b. The logical pages 50a and 50b are each associated with three clusters in physical memory having data totaling 4 KB in length. The data in the clusters can be written to the disk blocks 28a and 28b which also have a length of 4 KB.

The logical pages including the <address, length> pairs are passed to the disk controller device driver 46a. The <address, length> pairs can be used to reference the physical pages and to build a scatter/gather list in the DMA engine 23b of the disk controller 23a. The list can be used to write the data referenced by the logical pages to the corresponding disk blocks of file 29. For example, the disk controller device driver 46a, in conjunction with the disk controller and DMA engine, receives the logical pages 50a and 50b and uses the <address, length> pairs to transfer the data in the physical pages to the disk data blocks 28a and 28b.

Figure 5:
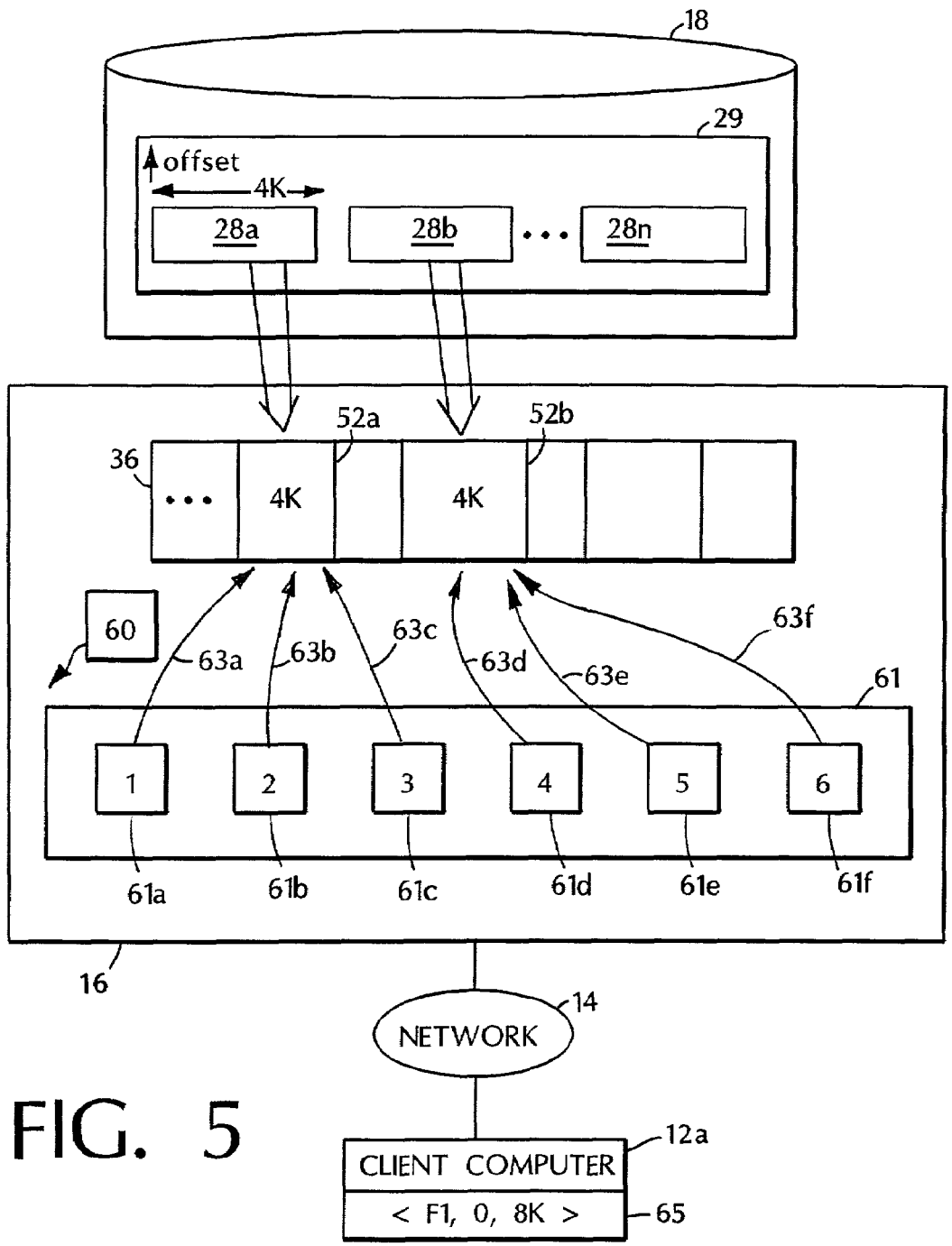
FIG. 5 is a diagram showing a file read request operation according to the present invention.

FIG. 5 shows a block diagram illustrating how file read requests from client computers are processed according to the invention. The client computer 12a can issue a file read request 65 using a network file protocol such as NFS or CIFS. The format of the file read request 65 is similar to the file write request discussed above. For example, the file read request 65 is represented by <F1, 0, 8 KB> where "file-name"=F1, "offset"=0, and the "length"=8 KB.

Upon receipt of the file read request 65, the computer system 16 can process the file read request. The computer system 16 can translate and search for the "file-name"=F1, the "offset"=0, and the "length"=8 KB on the storage resource 18. For example, the computer system 16 determines that the file 29 corresponds to the "file-name"=F1. In addition, the file 29 includes disk data blocks 28a through 28n. Each disk data block represents a fixed 4 KB chunk of data in file 29. For example, the disk block 28a corresponds to the first 4 KB of the "8 KB" file read request and the second disk block 28b corresponds to the second 4 KB of the "8 KB" file read request.

The computer system 16 allocates physical pages 52a through 52c in memory 36. The system 16 can then transfer the disk blocks 28a and 28b from the storage resource 18 to the physical pages 52a and 52b.

The system 16 then constructs a network protocol header 60 that points to a linked list of data buffers 61. For example, the linked list of data buffers can include data buffer 61a through 61f residing in memory 36. Each data buffer can contain pointers 62a through 62e to a subsequent data buffer thereby creating the linked list of data buffers. In addition, each data buffer 61a through 61f can contain pointers 63a through 63f pointing to corresponding data associated with the physical pages 52a and 52b. Note that pointers 63a and 63c share the same physical page as approximately 1400 bytes of a 1536 byte Ethernet packet is real data.

The system 16 can then process the linked list of data buffers 61 and transmit the physical pages 52a and 52b pointed to by each data buffer 61a through 61f. The system 16 may need to insert additional network packet information according to the packet size requirements of a particular network. For example, in an Ethernet network implementation, the packet size would be 1536 bytes. As a result, the data in the physical pages can be divided into 1536 byte network data packets to be transmitted over the network 14.

As a result, in this example, the client receives six network data packets in response to the original file read request. Consequently, the system 16 is able to respond to a network file read request efficiently since no data copying is necessary to move data from the storage resource to the network.

The examples discussed above corresponding to FIGS. 4 and 5 are only illustrative. For example, the system 16 can process different file read and write requests including requests with different offsets and lengths. Moreover, the physical and logical page arrangement can vary depending on various factors including the network type, network traffic, the arrival rate and size of the data packets over the network, and other factors.

Figure 6:
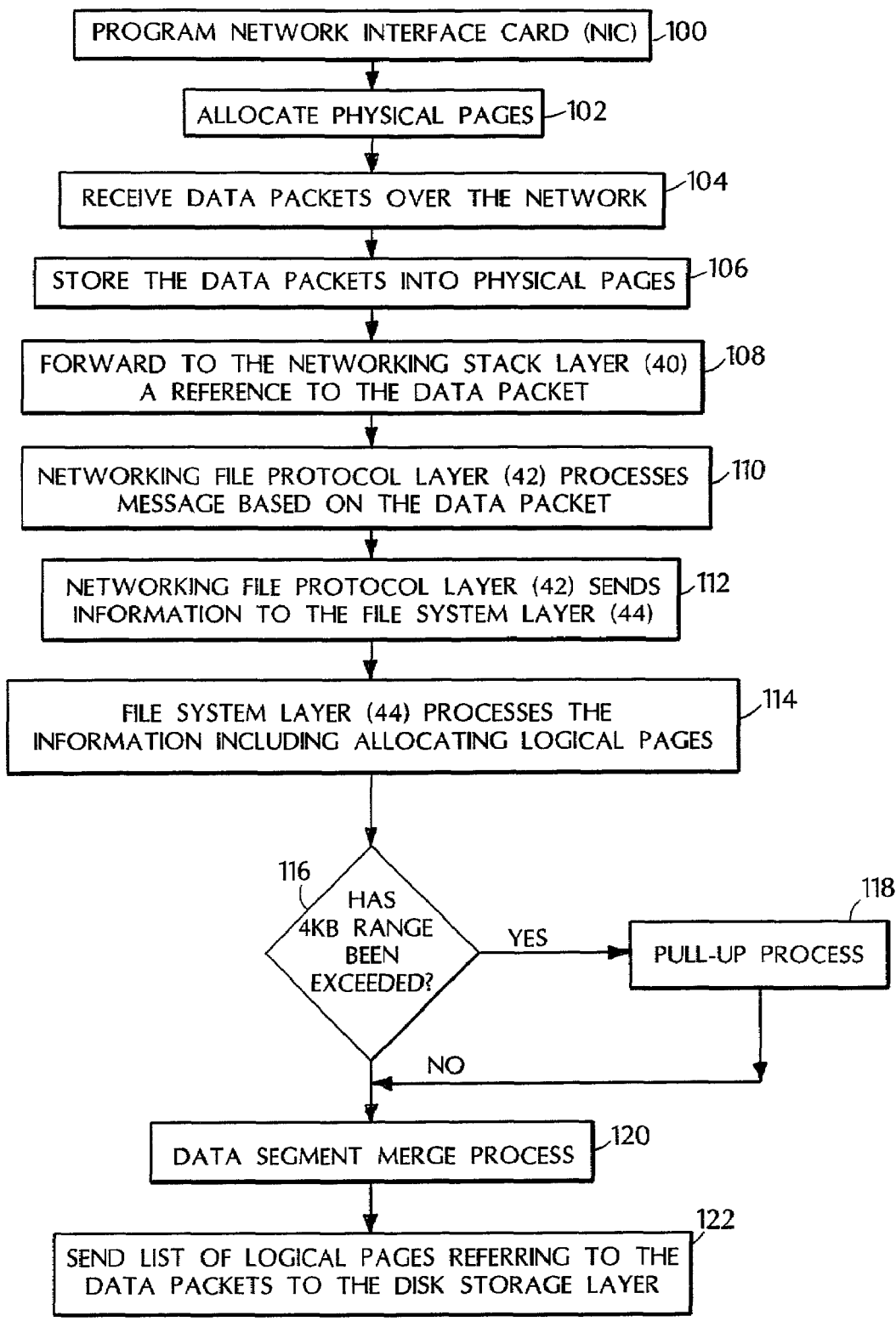
FIG. 6 is a flow chart illustrating a true zero-copy operation according to the present invention.
Figure 7A:
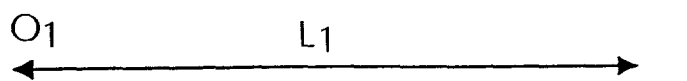
FIGS. 7A-7D are diagrams illustrating data merging operations according to the present invention.
Figure 7A:
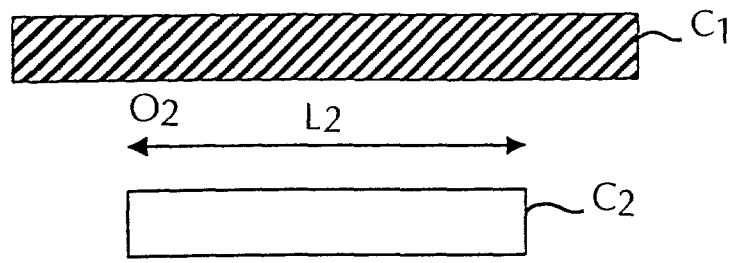
Figure 7A:
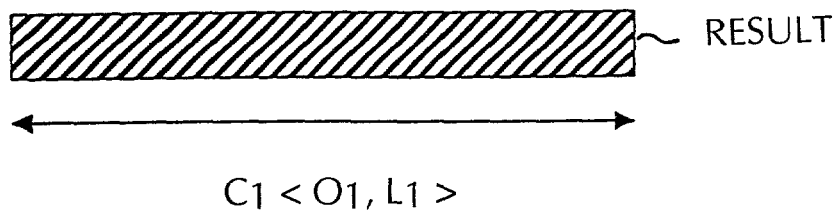
Figure 7B:
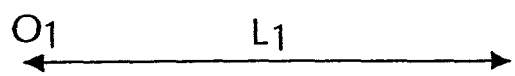
Figure 7B:
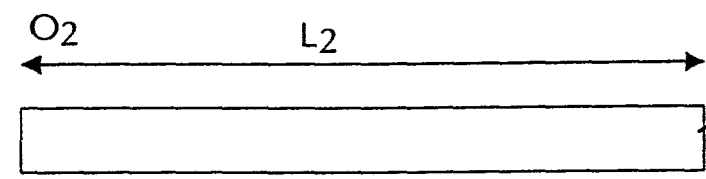
Figure 7B:
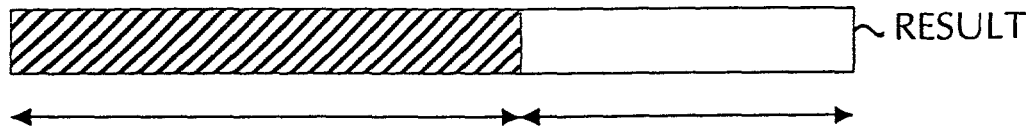
Figure 7C:
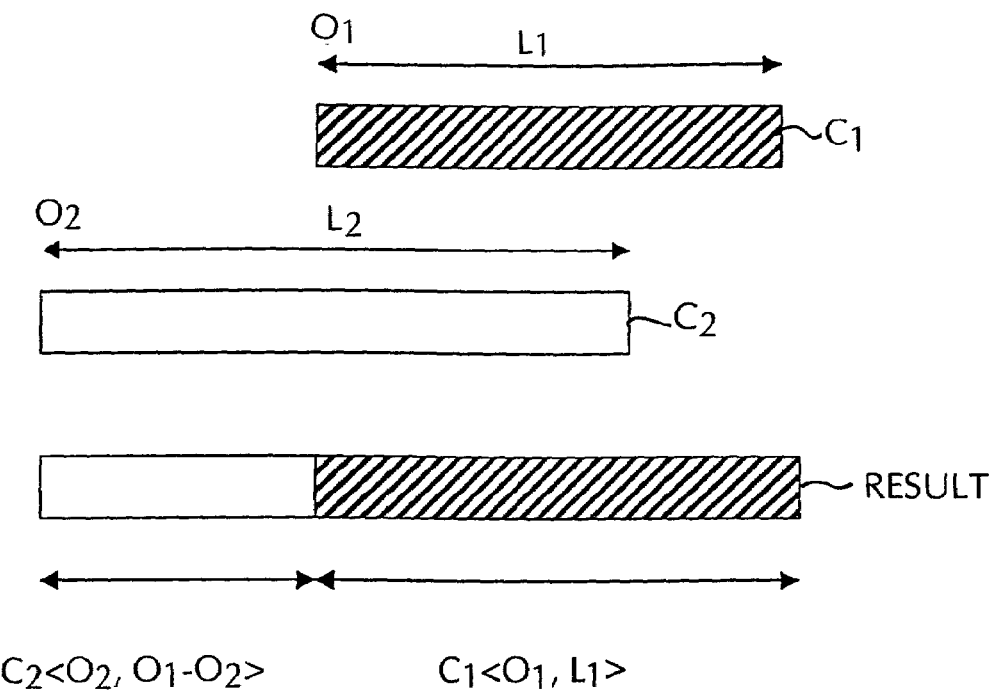
Figure 7D:
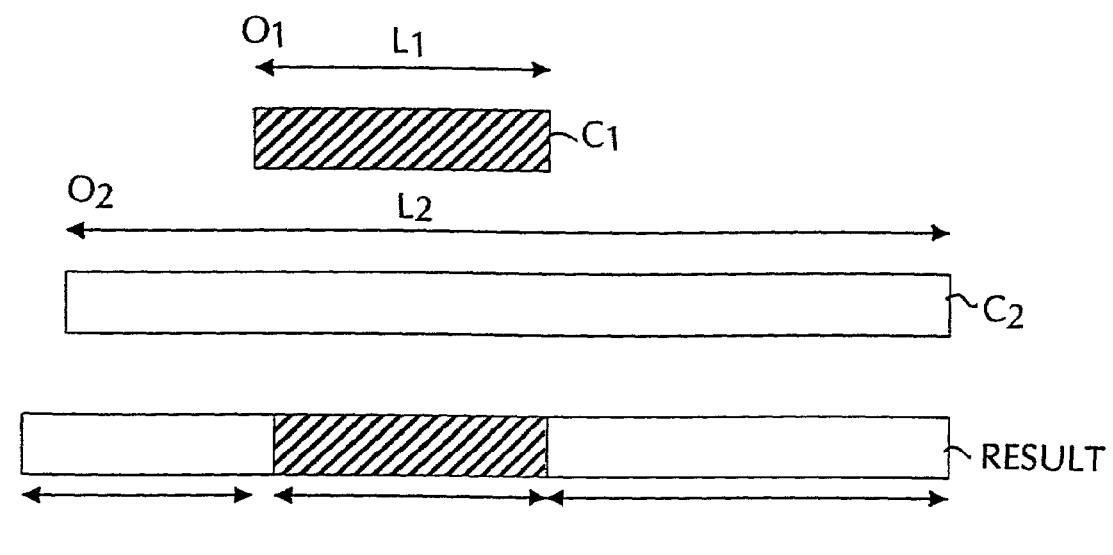

FIG. 6 is a detailed flowchart illustrating how network data packets 24 can be moved from a network 14 to a storage resource system 18 using the true zero-copy technique of the present invention. The NIC 15a can be programmed (block 100) to handle data packets received over the network as a result of a file write request by a client. The NIC 15a can be programmed by loading the addresses of physical pages into the DMA scatter-gather engine 15b of the NIC.

Physical pages to handle the data packets can be allocated (block 102) from the page subsystem 48. In a computer network 14, such as Ethernet, the maximum packet size is 1536 bytes. Therefore, it may not be efficient to allocate a single 4 KB physical page to a single packet. Instead, a single 4 KB physical page can be divided in such a manner that the first 2 KB portion can receive a first packet "n", and the second 2 KB portion can receive the second packet "n+1". The networking layer 40 may also include additional data structures to link together the data packets to the same destination.

After the NIC 15a has been programmed (block 100) and the physical pages allocated (block 102), the server 16 may be able to receive (block 104) data packets over the network 14. The data packets can then be stored (block 106) into the appropriate physical pages facilitated by the DMA feature of the NIC 15a.

Once the data packets have been received (block 104) and stored (block 106), references to the data packets can be created and then forwarded 108 to the networking stack layer 40 using traditional TCP/IP zero-copy techniques. For example, a pointer to the data that is relevant to each layer of the network stack, such as the TCP and IP layers in a TCP/IP protocol stack, can be examined and adjusted to point to the data that may be relevant for the next layer. Once the data packets reach its destination, the network file protocol metadata and the real data contents associated with each data packet may be examined.

The network file protocol layer 42 can process (block 110) a message and information related to the file write request. Such information may include the data packets received (block 104) by the NIC 15a that had been forwarded (block 108) by the network stack layer 40. In addition, the network file protocol layer 42 can interpret the message by examining the contents of the physical pages. It can then send the message to the underlying file system 44 which may respond with file related information. As a result, the network layer 42 can then determine file related information based on the message, such as, a file identifier and an offset and length of the range of the file to apply the network file protocol request.

The network protocol layer 42 can send (block 112) the information to the file system layer 44. In addition, the network layer can send (block 112) other information such as, for example, the data packets received by the NIC 15a and associated networking data structures.

The file system layer 44 can process (block 114) the information received by the network file protocol layer 42. Processing can include allocating blocks that may be necessary to cover the <offset, length> range of the file being written. In addition, the data structures from the networking layer 40 can be examined to determine (block 116) whether the 4 KB of data represented by an <offset, length> range has crossed over the maximum number of physical pages referenced by a logical page. For example, in a computer network such as Ethernet, the maximum number of physical pages is three data packets. However, file system protocols can apply alignment criteria which can result in a physical page that may not be filled with 1400 bytes from a 1536 byte Ethernet data packet. As a result, the logical page may need to include four physical page segments to represent 4 KB of aligned data in the system.

A determination (block 116) is made whether a 4 KB <offset, length> range is spread across more than four physical pages. If so, then a pull-up process (block 118) can be performed. The process can include moving data from other physical pages into the received data packet in order to satisfy the requirement of having four data packets represented by a logical page. However, the process may not often need to be performed since most network file protocols, such as CFS and NFS, cluster data packets sent from a client in order to efficiently transmit the data over the network.

A segment merge operation (block 120) may need to be performed on the data that is to be written to the requested file. This can include merging an incoming data packet (segment) representing an <offset, length> range with an existing segment <offset, length> which can result in the creation of three new <offset, length> segments. FIGS. 7A-7D illustrate the possible combinations that can result from a segment merge operation when segment 1 with content C1 overlays segment 2 with content C2. The contents of the segments are represented by Cn <On, Ln> where n represents the segment number and On and Ln represents the offset and length of a segment respectively.

Once the physical pages have been referenced by the logical pages, the information in the logical pages can be sent (block 122) to the storage resource 18 using current I/O techniques. The storage resource operates in conjunction with the disk controller 23a and associated disk controller device driver 46a. As discussed above, the storage resource 18 can be capable of operating with logical pages that may include multiple <address, length> segments and the DMA may need to be programmed accordingly. Some hardware interface cards may limit the number of DMA segments. Thus, I/O may need to be divided into multiple I/O operations. However, most current disk interface card can provide a flexible write DMA capability that can process unlimited or a large number of DMA segments.

Since there are a maximum of four segments that can be used to represent 4 KB of data, other techniques for merging segments can be implemented. For example, 4096 KB can be represented by 4096 one-byte segments. A property of data segments can be composed of a physical 2 KB segment. As discussed above, a 4 KB physical page can be split into two 2 KB physical segments. Therefore, when a segment merging operation is performed that results in more than the maximum permissible segments such as, for example four, then a "pull-up" operation can be performed. The "pull-up" operation coalesces the data such that the smallest number of segments required to represent the merge can be used. For example, the process can include copying data so that the data segments with the lowest offset are filled to the 2 KB capacity. The process can be repeated as each segment is filled. However, not all of a 2 KB segment may be available for the "pull-up" operation, since a 2 KB segment can contain additional protocol and file data.

The methods described above can result in a zero-copy operation for almost all file write operations over the network. All possible file content state, such as invalid, valid, and zeros (hole), can be represented without performing a copy operation. For example, data that is beyond the end-of-file (EOF) can be represented by an invalid segment (NULL "address" pointer). In addition, a file system's I/O subsystem can enforce disk-alignment requirements which may cause a read-modify-write operation to be performed. For example, if a single byte is written to the middle of an existing file, then when the byte is actually written to a disk, a disk sector (512 bytes) may need to be read to represent valid data that is aligned on the sector.

A number of embodiments of the invention have been described. Nevertheless, it will be understood that various modifications may be made without departing from the spirit and scope of the invention. For example, it is not required that the size of physical pages and the logical pages be based on Ethernet. Instead, the size can be changed to accommodate the requirements of a network other than Ethernet. Further, the techniques, systems, and methods, can be practiced regardless of OS or programming language or hardware used to practice or implemented any aspect of the invention described herein. Accordingly, other embodiments are within the scope of the following claims.

What is claimed is:

1. A method comprising:
moving data from a network layer into a physical memory page, wherein the network layer receives and transmits the data as data packets that are odd-sized, arrive asynchronously, and contain metadata embedded with real data and the physical memory page comprises a plurality of physical memory clusters;
creating a logical page providing an aligned view of the data;
establishing a relationship between the logical page and the physical memory page such that the logical page is associated with the plurality of physical memory clusters;
forwarding a list of the logical pages to a storage resource such that the data referenced by the logical pages are stored subsequently into a storage resource; and
merging an existing physical memory cluster with a new physical memory cluster based on the offset and length of the existing physical memory cluster and based on the offset and length of the new physical memory cluster.

2. A computer system comprising:
a memory including at least one physical memory page and at least one logical page;
a network layer for receiving non-aligned data, wherein the network layer receives and transmits the data as data packets that are odd-sized, arrive asynchronously, and contain metadata embedded with real data;
a storage resource providing aligned data; and
a processor configured to:
move data from a network layer into a physical memory page, the physical memory page comprising a plurality of physical memory clusters,
create a logical page providing an aligned view of the data,
establish a relationship between the logical page and the physical memory page such that the logical page is associated with the plurality of physical memory clusters, and
forward a list of the logical pages to a storage resource such that the data referenced by the logical pages are stored subsequently into a storage resource;
wherein the processor is further configured to merge an existing physical memory cluster with a new physical memory cluster based on the offset and length of the existing physical memory cluster and based on the offset and length of the new physical memory cluster.

3. An article comprising a computer-readable storage medium that stores computer executable instructions for causing a computer to:
move data from a network layer into a physical memory page, wherein the network layer receives and transmits the data as data packets that are odd-sized, arrive asynchronously, and contain metadata embedded with real data and the physical memory page comprises a plurality of physical memory clusters;
create a logical page providing an aligned view of the data;
establish a relationship between the logical page and the physical memory page such that the logical page is associated with said the plurality of physical memory clusters; and
forward a list of the logical pages to a storage resource such that the data referenced by the logical pages are stored subsequently into a storage resource; and
merge an existing physical memory cluster with a new physical memory cluster based on the offset and length of the existing physical memory cluster and based on the offset and length of the new physical memory cluster.

* * * * *